US006318791B1

United States Patent
Pfertner

(10) Patent No.: US 6,318,791 B1
(45) Date of Patent: Nov. 20, 2001

(54) FOLDING TOP FOR A MOTOR VEHICLE

(75) Inventor: Kurt Pfertner, Wimsheim (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 09/567,066

(22) Filed: May 8, 2000

(30) Foreign Application Priority Data

May 7, 1999 (DE) .............................. 199 21 305

(51) Int. Cl.$^7$ ...................................................... B60J 7/00
(52) U.S. Cl. ...................... 296/107.06; 296/214
(58) Field of Search .............. 296/107.06, 214, 296/107.15, 107.12

(56) References Cited

U.S. PATENT DOCUMENTS

| | | | | |
|---|---|---|---|---|
| 2,482,323 | * | 9/1949 | Cromwell et al. | 296/107.12 |
| 2,708,137 | * | 5/1955 | Poelman | 296/107.06 |
| 3,075,804 | * | 1/1963 | Geiger et al. | 296/107.12 |
| 3,319,995 | * | 5/1967 | Bohn | 296/107.06 |
| 4,708,389 | * | 11/1987 | Maebayashi et al. | 296/107.12 |
| 4,746,163 | * | 5/1988 | Muscat | 296/107.06 |
| 4,923,244 | * | 5/1990 | Clenet | 296/214 |
| 4,964,668 | * | 10/1990 | Hofmann | 296/107.06 |
| 5,002,330 | * | 3/1991 | Koppenstein et al. | 296/107.12 |
| 5,511,844 | * | 4/1996 | Boardman | 296/214 |
| 5,540,476 | * | 7/1996 | Cowsert | 296/107.06 |
| 5,947,546 | * | 9/1999 | Hilliard et al. | 296/107.12 |
| 6,186,587 | * | 2/2001 | Entenmann | 296/214 |

FOREIGN PATENT DOCUMENTS

| | | |
|---|---|---|
| 40 01 136 A1 | 7/1991 | (DE) . |
| 40 31 270 C1 | 10/1991 | (DE) . |
| 44 41 666 C1 | 12/1995 | (DE) . |
| 196 16 891 C1 | 8/1997 | (DE) . |
| 297 15 828 U1 | 3/1998 | (DE) . |
| 196 13 356 C2 | 4/1998 | (DE) . |
| 0 356 639 | 3/1990 | (EP) . |
| 95/11140 | 4/1995 | (WO) . |

* cited by examiner

Primary Examiner—D. Glenn Dayoan
Assistant Examiner—Hilary Gutman
(74) Attorney, Agent, or Firm—Crowell & Moring, LLP

(57) ABSTRACT

A folding top for a vehicle is composed of a folding top structure and a folding top cover. The folding top structure, which interacts with folding top bearings arranged on a vehicle body side, includes a forward large-surface dimensionally stable folding top section which extends adjacent to the windshield frame, a main hoop, and a rear-side tensioning bow. To reduce the noise level in the vehicle occupant compartment during vehicle operation, an interior ceiling is provided on the side of the folding top structure facing a vehicle occupant compartment. The interior ceiling is composed of a center part and two lateral parts linked to longitudinal sides of the center part. The center part is detachably fastened on the large-surface dimensionally stable folding top section as well as on the main hoop. The lower edge areas of both lateral parts are detachably held in position, on one side, at the tensioning bow and, on the other side, on the folding top bearings.

20 Claims, 6 Drawing Sheets

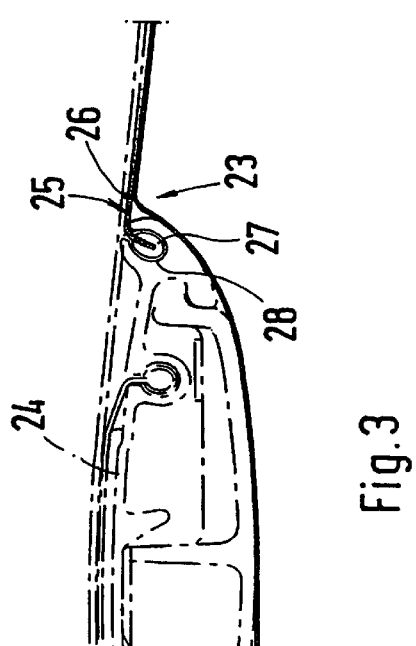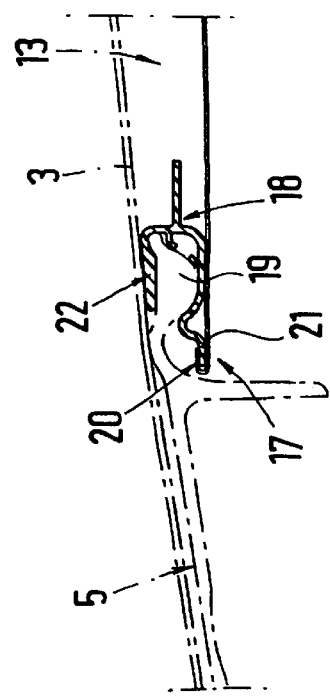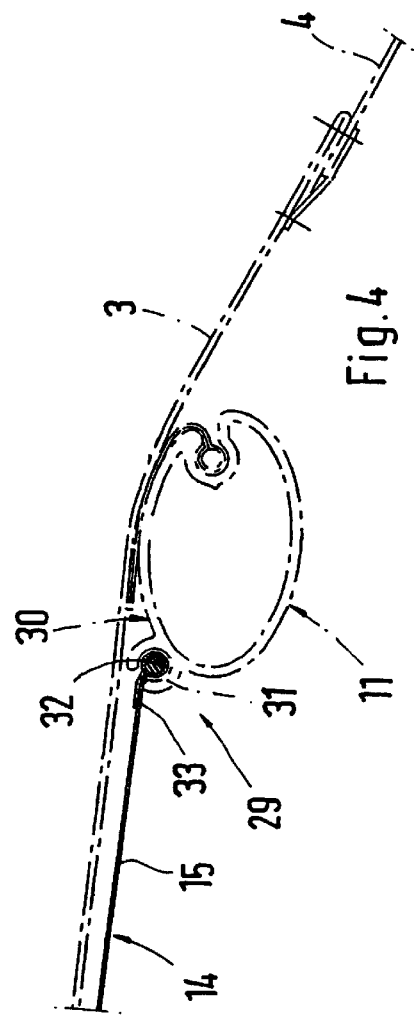

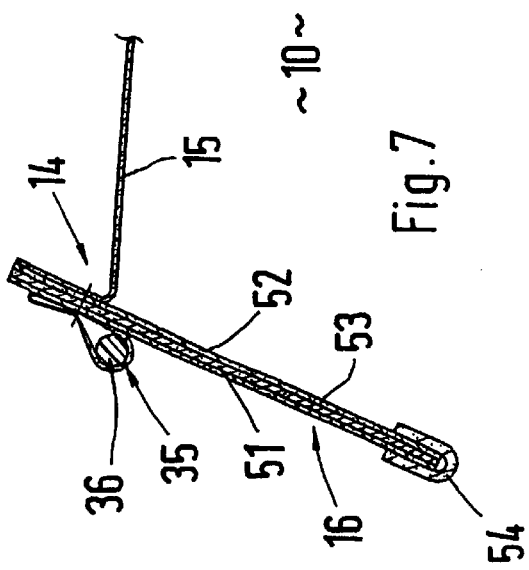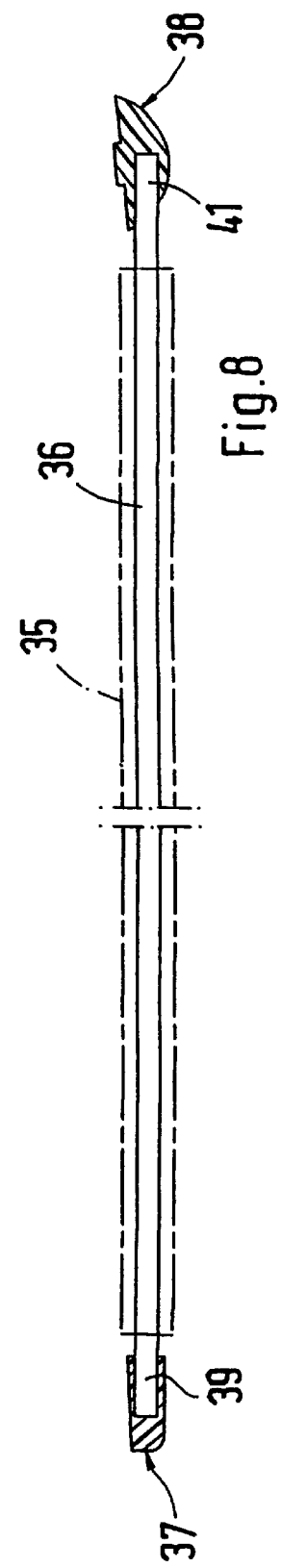

FOLDING TOP FOR A MOTOR VEHICLE

This application claims the priority of German application 199 21 305.4, filed May 7, 1999, the disclosure of which is expressly incorporated by reference herein.

BACKGROUND AND SUMMARY OF THE INVENTION

The present invention relates to a folding top for a motor vehicle, such as a passenger car, including a folding top structure, and a folding top cover which is mounted, on an exterior side, on the folding top structure. The folding top structure, which interacts with folding top bearings arranged on a vehicle body side, has a forward large-surface dimensionally stable folding top section which extends adjacent to the windshield frame, a main hoop, and a rear-side tensioning bow.

German Patent Document DE 44 41 666 C1 discloses a folding top for a passenger car which is composed of a folding top structure and a folding top cover mounted on an exterior side on the folding top structure. The folding top structure, which interacts with folding top bearings arranged on the vehicle body side, comprises a large-surface, dimensionally stable folding top section which extends adjacent to the windshield frame, a main hoop which spans the vehicle occupant compartment in a curved manner, and a rear-side tensioning bow. This folding top is distinguished by its simple construction, high stability and good function.

It is an object of the invention to further develop a folding top of the initially mentioned type such that the noise level is reduced inside the vehicle occupant compartment during driving operation of the vehicle.

According to the invention, this object is achieved by an interior ceiling provided on a side of the folding top structure facing a vehicle occupant compartment, the interior ceiling being composed of a center part and two lateral parts linked to longitudinal sides of the center part. The center part is detachably fastened on the large-surface dimensionally stable folding top section as well as on the main hoop, and lower edge areas of both lateral parts are detachably held in position, on one side, at the tensioning bow and, on another side, on the folding top bearings.

Additional characteristics advantageously further developing the invention are reflected in the claims.

A principal advantage achieved by the invention is that, as a result of the arrangement of an interior ceiling, the noise level in the vehicle occupant compartment is clearly lowered during driving. Also, the interior ceiling can be connected with the folding top in a fast and simple manner and can be demounted again in a customer-service-friendly fashion.

The interior ceiling is advantageously composed of an approximately rectangular center part and two lateral parts connected to longitudinal sides of the center part. The center part is detachably connected in front, at the rear and on sides to the large-surface forward folding top section. In addition, this center part is detachably fixed to the transversely extending upper section of the main hoop. End pieces of a forward clamping strip simultaneously form a forward bearing of lateral holding wires on which lateral loops of the interior ceiling can be fixed. The two lateral parts are detachably fastened only on their lower edge areas on the rear-side tensioning bow and on both folding top bearings.

An embodiment of the invention is illustrated in the drawings and will be explained in detail.

BRIEF DESCRIPTION OF THE DRAWINGS

FIG. 3 is an enlarged sectional view along line III—III of FIG. 2;

FIG. 4 is an enlarged sectional view along line IV—IV of FIG. 2;

FIG. 7 is an enlarged sectional view along line VII—VII of FIG. 2;

FIG. 8 is an enlarged sectional view along line VIII—VIII of FIG. 2;

DESCRIPTION OF THE PREFERRED EMBODIMENTS

Figure 1:
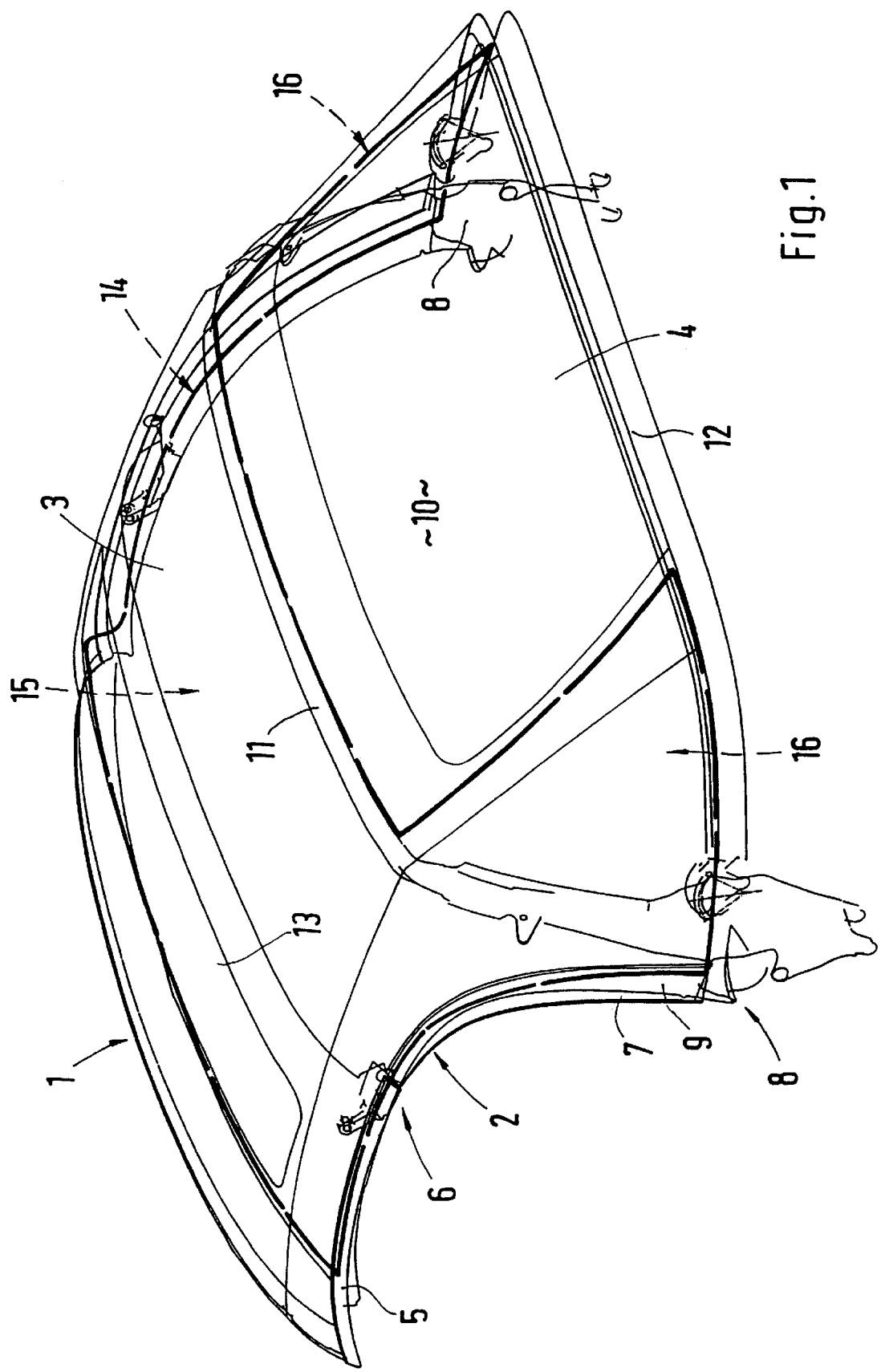
FIG. 1 is a perspective view, diagonally from the rear, of a folding top with an interior ceiling.

A folding top 1 for a vehicle, particularly for a passenger car, is composed of a folding top structure 2 and a flexible folding top cover 3 which is mounted, on the exterior side, on the folding top structure 2. In the rearward area of the folding top cover 3, a window 4 is provided; this window may be a flexible or rigid rear window.

The folding top structure 2 comprises essentially a large-surface, dimensionally stable folding top section 5 which is arranged adjacent to a windshield frame and which is supported on each of its two longitudinal sides 6 by way of a B-column control arm 7, which is constructed in one piece, directly on the adjacent folding top bearing 8. A main control arm 9 is also arranged adjacent to each B-column control arm 7 for linking the dimensionally stable folding top section 5. In addition, the folding top structure 2 comprises a main hoop 11, which spans the vehicle occupant compartment 10 in a curved manner, and a rear-side tensioning bow 12. The construction of the folding top structure 2 is described in detail in German Patent Document DE 44 41 666 C1. The large-surface, dimensionally stable folding top section 5 is formed by a diecast part made of a light-metal alloy (for example, an aluminum or magnesium alloy) and, for reasons of weight, has a central, approximately rectangular recess 13.

For reducing the noise level occurring inside the vehicle occupant compartment 10 during the driving operation of the vehicle, an interior ceiling 14 is provided on the side of the folding top structure 2 facing the vehicle occupant compartment 10. The interior ceiling 14 is detachably fastened locally on the large-surface forward folding top section 5, on the main hoop 11, on the rear-side tensioning bow 12 and on both folding top bearings 8.

The interior ceiling 14, made of a ceiling fabric, is composed of an approximately rectangular center part 15 and two lateral parts 16 which are linked to the longitudinal sides of the center part 15. The lateral parts 16 are sewn to the center part 15 in each case along the longitudinal course of the center part 15.

On the forward edge area 17 of the center part 15 of the interior ceiling 14, a profiled transversely extending clamping strip 18 made of plastic is provided. The clamping strip is fitted onto a correspondingly constructed, undercut flange 19 of the dimensionally stable folding top section 5 (FIG. 3). The flange 19 forms a forward transversely extending boundary of the rectangular recess 13.

A turned-down forward end area 20 is fixedly connected by sewing and/or gluing with a lower leg 21 of the clamping strip 18 which has an approximately U-shaped profile. The upper leg 22 has a shorter length than the profiled lower leg 21 (FIG. 3). When the interior ceiling 14 is mounted, the ceiling fabric completely covers the clamping strip 18 situated above it.

Figure 2:
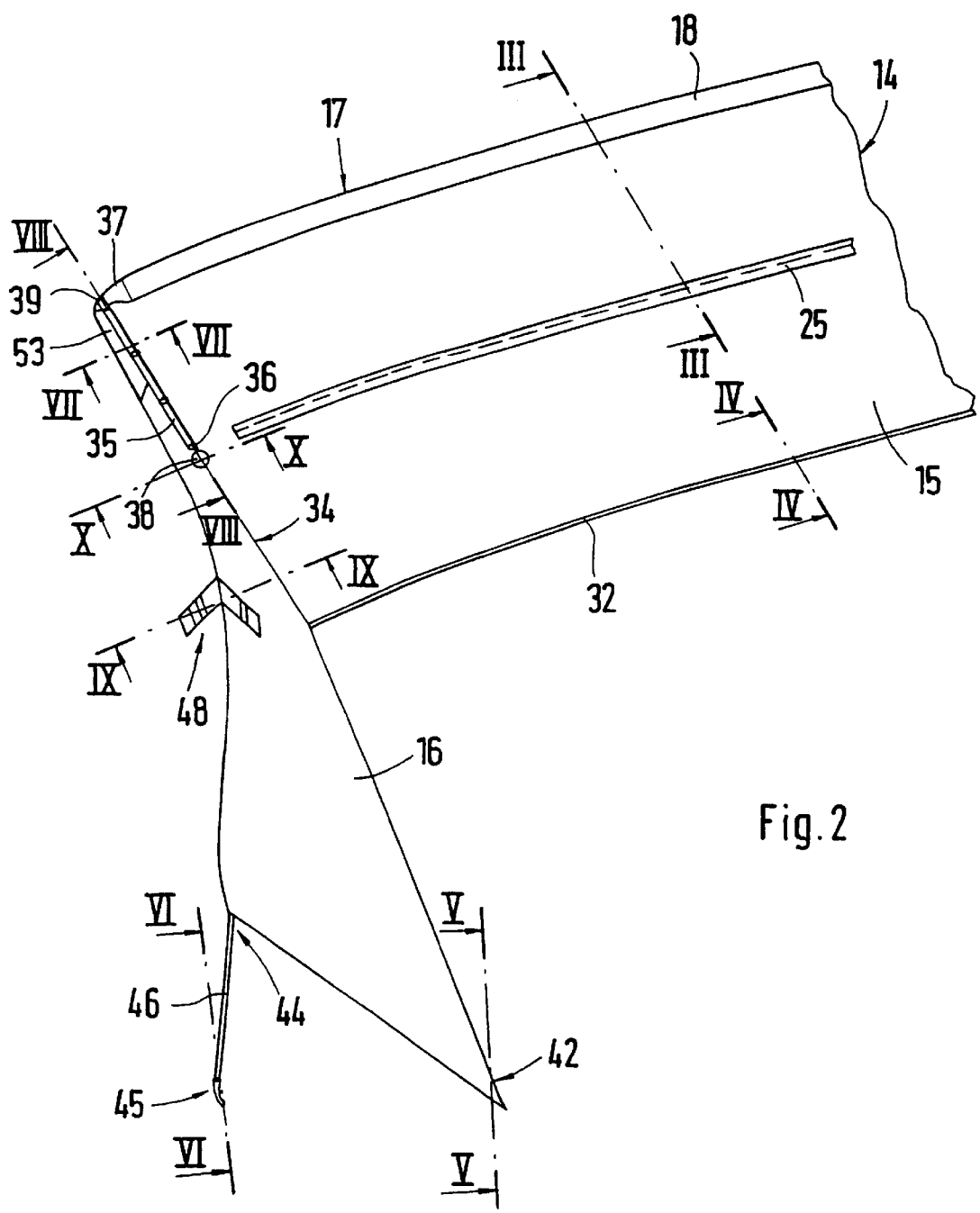
FIG. 2 is a perspective partial view, diagonally from the rear, of the interior ceiling of the folding top.

On the rearward edge area 23 of the dimensionally stable folding top section 5, the interior ceiling 14 is pulled up along the interior contour of the folding top section 5 or of a strip 24, which can be snapped on from above, and is detachably fastened to the strip 24. For fastening the interior ceiling 14, a transversely extending dart 25 is provided on the top side of the ceiling fabric and is connected in sections by gluing and by a transversely extending seam 26 with the ceiling fabric. A weatherstrip profile 27 made of plastic is fitted onto a free end of the dart 25 situated in front of the seam 26 and is fixedly connected with the dart 25. The weatherstrip profile 27 can be inserted from the side into a transversely extending, undercut receiving groove 28 which is formed on the upper rearward end of the strip 24 which can be snapped on. Viewed in the transverse direction of the vehicle, the dart 25 and the weatherstrip profile 27 are slightly narrower than the center part 15 of the interior ceiling 14 (FIGS. 2 and 3).

The rearward transversely extending edge area 29 of the center part 15 of the interior ceiling 14 extends at a distance from the upper edge of the window 4 and is detachably fastened to the front side of an upper transversely extending section 30 of the main hoop 11 (FIG. 4). For this purpose, an undercut receiving groove 31 is formed on the transversely extending hollow profile of the main hoop 11, into which receiving groove 31 a turned-down hook-end-shaped edge 33 of the center part 14, which is provided with an insert 32, can be pushed in from the side. The bendable insert 32, which is circular in its cross-section and is made of plastic, rubber or the like, is inserted into the hook-end-shaped edge of the center part 14. Both laterally exterior ends of the edge 33 are closed by sewing after the insertion of the insert 32.

Figure 11:
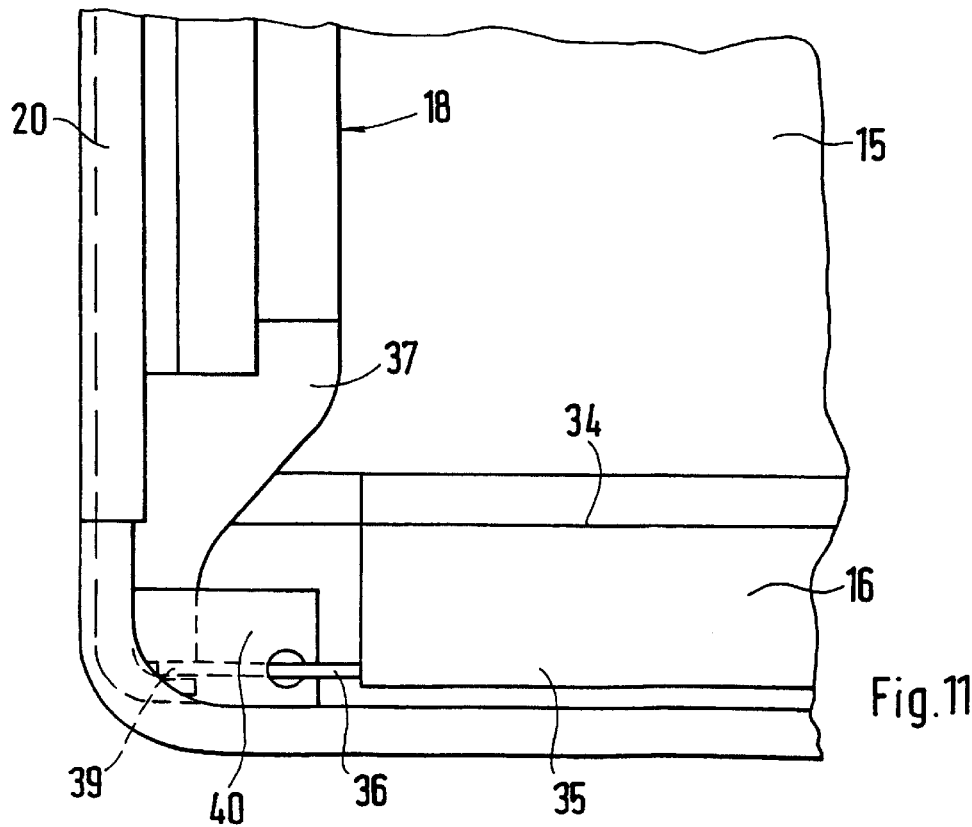
FIG. 11 is an enlarged view of a portion of the structure shown in FIG. 2.

In the common connection area 34 of the center part 15 and the lateral part 16, one lateral fastening respectively of the interior ceiling 14 is provided on the dimensionally stable folding top section 5. For this purpose, a longitudinally extending holding loop 35 is sewn to the interior ceiling 14 on the side facing away from the vehicle occupant compartment 10, through which holding loop 35 a stable holding wire 36 can be guided (FIG. 7). The holding wire 36 protrudes over the longitudinally extending holding loop 35 at both ends. A forward end of the holding wire 36 can be fixed to a lateral end piece 37 of the transversely extending clamping strip 18, and the other end can be fixed to a holding button 38 which can be snapped into the dimensionally stable folding top section 5. Each lateral end piece 37 of the clamping strip 18 has a different profiling than the clamping strip 18 and is fixedly connected therewith, for example, by welding. In the top view, the lateral end piece 37 tapers toward the outside and has, at its free exterior end, a cylindrical recess 39 extending in the longitudinal direction of the vehicle. A forward end of the holding wire 36 can be inserted into the recess 39. The free end of the end piece 37 can be fitted into a receiving pocket 40 arranged at the top side of each lateral part (FIG. 11).

Figure 5:
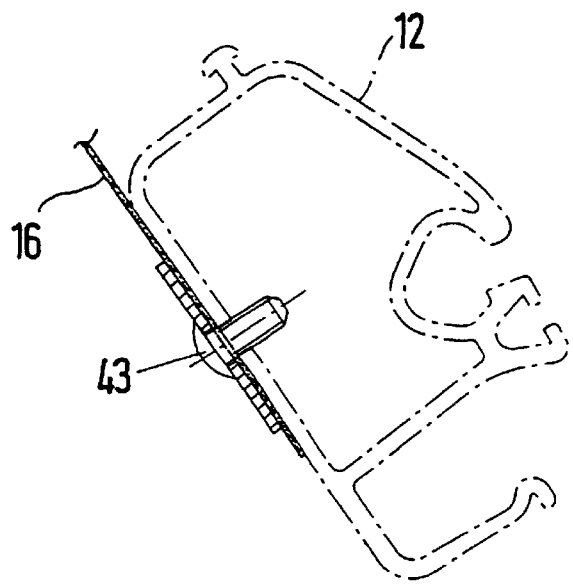
FIG. 5 is an enlarged sectional view along line V—V of FIG. 2.
Figure 6:
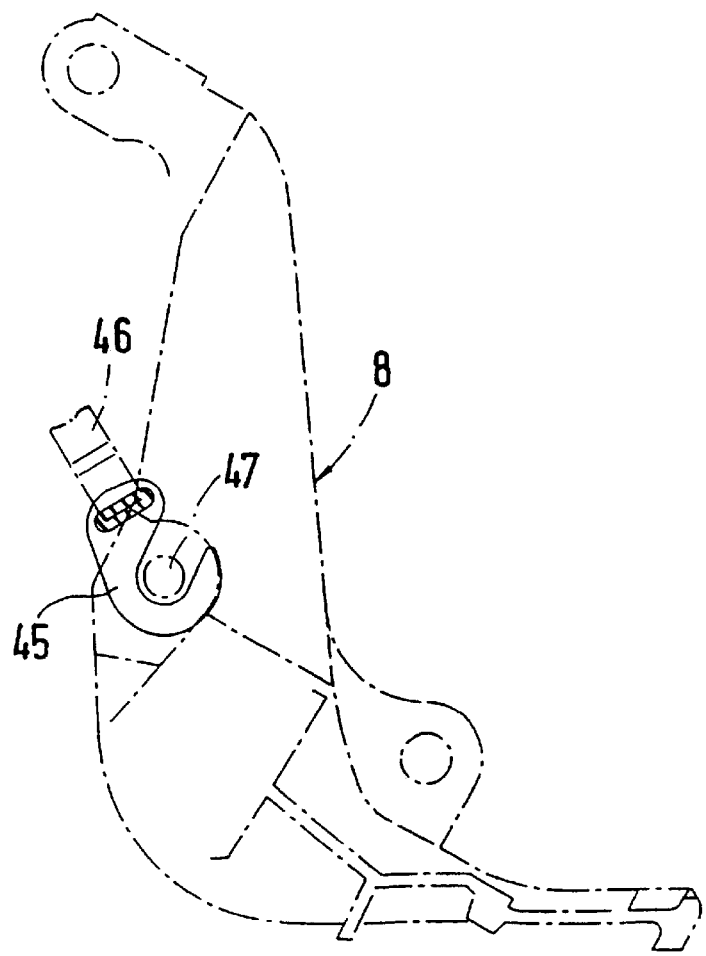
FIG. 6 is an enlarged sectional view along line VI—VI of FIG. 2.

An opening for guiding through the holding wire 36 is arranged at the receiving pocket 40. The holding button 38 is made of plastic and can be snapped from below into the dimensionally stable folding top section 5. The holding button has another cylindrical recess 41 for receiving the rearward end area of the holding wire 36. The longitudinally extending holding loop 35 starts approximately as an extension of the rear edge of the clamping profile 18 and ends shortly in front of the transversely extending dart 25. The lateral parts 16 of the interior ceiling 14 widen continuously from the front toward the rear. The interior lower edge area 42 of the two lateral parts 16, in the illustrated embodiment, is connected by way of a screwed connection 43 with the adjacent rear-side tensioning bow 12 (FIG. 5).

The exterior lower edge area 44 of the two lateral elements 16 is fastened by a hook 45 to the adjoining folding top bearing 8 situated underneath. A tensioned flexible double-layer tension element 46 made of rubber is connected between the hook 45 and the lateral part 16. The hook 45 reaches around a transversely extending bolt 47 of the folding top bearing 8. The exterior edge of each lateral part 16 is connected approximately in a central area of its longitudinal course by way of a detachable VELCRO fastener 48 with the main control arm 9 of the folding top structure 2.

Figure 9:
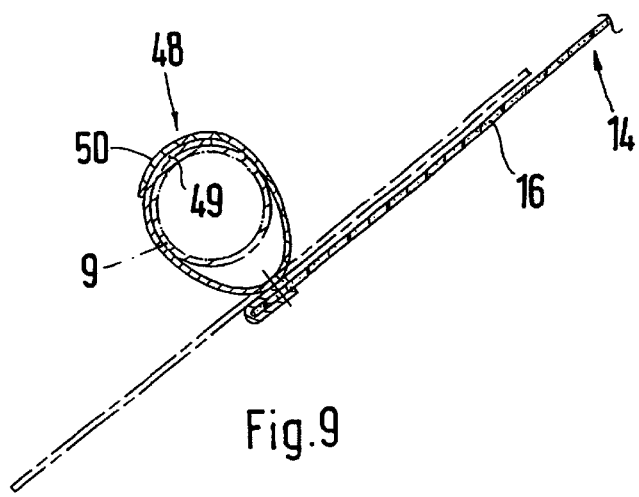
FIG. 9 is an enlarged sectional view along line IX—IX of FIG. 2.
Figure 10:
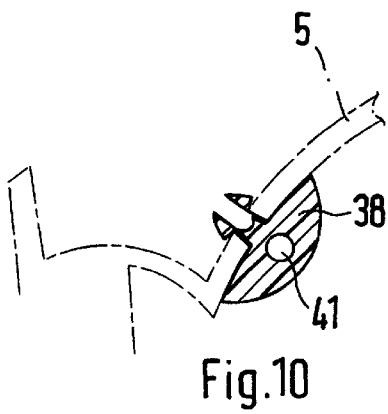
FIG. 10 is an enlarged sectional view along line X—X of FIG. 2.

Each VELCRO fastener 48 consists of a strip-shaped VELCRO band 49 and a strip-shaped pad-type band 50. Each band is sewn at one end to the edge area of the lateral part 16. Both bands 49, 50 are guided in sections around the main control arm 9 and are then placed above one another, whereby connection by way of the VELCRO fastener takes place (FIG. 9).

In the forward area, each lateral part 16 has a double-layer construction, with an inner stiffening insert 53 being embedded between the fabric layers 51, 52. The lateral parts 16 are provided along a significant portion of their circumferences with an edge-side bordering strip 54 (FIG. 7).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

I claim:

1. Folding top for a vehicle, comprising:
   a folding top structure,
   a folding top cover which is mounted, on an exterior side, on the folding top structure,
   the folding top structure, which interacts with folding top bearings arranged on a vehicle body side, having a forward large-surface dimensionally stable folding top section which extends adjacent to a windshield frame, a main hoop and a rear-side tensioning bow, and
   an interior ceiling provided on a side of the folding top structure facing a vehicle occupant compartment, said interior ceiling composed of a center part and two lateral parts linked to longitudinal sides of the center part,
   wherein the center part is detachably fastened on the large-surface dimensionally stable folding top section as well as on the main hoop, and
   wherein lower edge areas of both of said lateral parts are detachably held in position, on one side, at the tensioning bow and, on another side, on the folding top bearings.

2. Folding top according to claim 1, wherein each of said lateral parts is connected by sewing with an adjacent longitudinal side of the center part.

3. Folding top according to claim 2, wherein the lower edge areas include interior lower edge areas being held in position by way of a screwed connection on the rear-side tensioning bow.

4. Folding top according to claim 2, wherein the lower edge areas include exterior lower edge areas being fastened by a hook on one of said folding top bearings, and further comprising a tensioned flexible tension element connected between the hook and one of the lateral parts.

5. Folding top according to claim 2, wherein an exterior edge of each of said lateral parts is connected approximately in a central area by way of a detachable VELCRO fastener with a main control arm of the folding top structure.

6. Folding top according to claim 1, wherein a folded-down forward end area of the interior ceiling is connected with a profiled transversely extending clamping strip, which is fitted onto a correspondingly constructed profiled flange of the dimensionally stable folding top section.

7. Folding top according to claim 6, wherein the end area of the interior ceiling can be fixed on the clamping strip by at least one of sewing and gluing.

8. Folding top according to claim 3, wherein, approximately in a common connection area of the center part and one of the lateral parts on the interior ceiling, on the exterior side, a longitudinally extending holding loop is arranged through which a holding wire can be guided which can be fixed on a lateral end piece of the transversely extending clamping strip and can be fixed on a holding button which can be snapped into the dimensionally stable folding top section.

9. Folding top according to claim 8, wherein a receiving pocket is constructed on a top side of each of said lateral parts, and wherein a free end of the end piece of the transversely extending clamping strip can be fitted into the receiving pocket.

10. Folding top according to claim 8, wherein a cylindrical recess which can receive a forward end area of the holding wire is constructed at a free end of the end piece.

11. Folding top according to claim 8, wherein a cylindrical recess which can receive a rearward end area of the holding wire is provided on the holding button.

12. Folding top according to claim 6, wherein the lower edge areas include interior lower edge areas being held in position by way of a screwed connection on the rear-side tensioning bow.

13. Folding top according to claim 6, wherein the lower edge areas include exterior lower edge areas being fastened by a hook on one of said folding top bearings, and further comprising a tensioned flexible tension element connected between the hook and one of the lateral parts.

14. Folding top according to claim 6, wherein an exterior edge of each of said lateral parts is connected approximately in a central area course by way of a detachable VELCRO fastener with a main control arm of the folding top structure.

15. Folding top according to claim 1, and further comprising a dart by which the interior ceiling can be fixed on a rearward transversely extending edge of the dimensionally stable folding top section, said dart being arranged on the interior ceiling, which can be introduced by way of an end-side weatherstrip profile into an undercut receiving groove of a strip which can be snapped from above onto the dimensionally stable folding top section.

16. Folding top according to claim 1, wherein a rearward transversely extending edge area of the interior ceiling can be fixed on an upper transversely extending section of the main hoop.

17. Folding top according to claim 16, wherein, at a forward upper edge of the transversely extending section of the main hoop, an undercut receiving groove is constructed for fastening the rearward edge area of the center part of the interior ceiling.

18. Folding top according to claim 1, wherein the lower edge areas include interior lower edge areas being held in position by way of a screwed connection on the rear-side tensioning bow.

19. Folding top according to claim 1, wherein the lower edge areas include exterior lower edge areas being fastened by a hook on one of said folding top bearings, and further comprising a tensioned flexible tension element connected between the hook and one of the lateral parts.

20. Folding top according to claim 1, wherein an exterior edge of each of said lateral parts is connected approximately in a central area by way of a detachable VELCRO fastener with a main control arm of the folding top structure.

\* \* \* \* \*